United States Patent
Shimamura et al.

(10) Patent No.: US 12,347,217 B2
(45) Date of Patent: Jul. 1, 2025

(54) INFORMATION PROCESSING APPARATUS, INFORMATION PROCESSING METHOD, AND COMPUTER PROGRAM

(71) Applicant: Yokogawa Electric Corporation, Tokyo (JP)

(72) Inventors: Kie Shimamura, Musashino (JP); Tomohiro Kuroda, Musashino (JP); Yukiyo Akisada, Musashino (JP); Makoto Niimi, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 294 days.

(21) Appl. No.: 17/999,497

(22) PCT Filed: Apr. 13, 2021

(86) PCT No.: PCT/JP2021/015334
§ 371 (c)(1),
(2) Date: Nov. 21, 2022

(87) PCT Pub. No.: WO2022/004097
PCT Pub. Date: Jan. 6, 2022

(65) Prior Publication Data
US 2023/0237823 A1    Jul. 27, 2023

(30) Foreign Application Priority Data
Jun. 30, 2020    (JP) .................................. 2020-113508

(51) Int. Cl.
*G06V 30/14*    (2022.01)
*G06V 30/19*    (2022.01)

(52) U.S. Cl.
CPC .... *G06V 30/1448* (2022.01); *G06V 30/19093* (2022.01)

(58) Field of Classification Search
CPC ......... G06V 30/1448; G06V 30/19093; G06V 30/226; G06V 30/42; G06V 30/41
(Continued)

(56) References Cited

U.S. PATENT DOCUMENTS

| | | | |
|---|---|---|---|
| 9,679,217 B2 * | 6/2017 | Suzuki | G06V 30/1475 |
| 2012/0257832 A1 * | 10/2012 | Kobayashi | G06V 30/387 382/182 |
| 2015/0138220 A1 * | 5/2015 | Chapman | G06V 30/245 345/589 |

(Continued)

FOREIGN PATENT DOCUMENTS

| | | |
|---|---|---|
| EP | 3104302 A1 | 12/2016 |
| JP | 11-126216 A | 5/1999 |

(Continued)

OTHER PUBLICATIONS

Extended European Search Report (EESR) dated May 8, 2024 issued in European patent application No. 21833206.2.
(Continued)

*Primary Examiner* — Jacky X Zheng
(74) *Attorney, Agent, or Firm* — RANKIN, HILL & CLARK LLP

(57) ABSTRACT

An information processing apparatus (10) includes a controller (11) that acquires an image containing a figure and a character string and generates association information indicating an association between the figure and the character string based on a positional relationship between the figure and the character string in the image.

8 Claims, 10 Drawing Sheets

(58) Field of Classification Search
USPC .................................................. 382/225, 229
See application file for complete search history.

(56) References Cited

U.S. PATENT DOCUMENTS

| | | | | |
|---|---|---|---|---|
| 2015/0261735 | A1* | 9/2015 | Ohguro | G06F 16/5846 |
| | | | | 715/268 |
| 2016/0063340 | A1* | 3/2016 | Suzuki | G06V 30/1475 |
| | | | | 382/177 |
| 2018/0217976 | A1* | 8/2018 | Hwang | G06F 40/242 |
| 2019/0147039 | A1* | 5/2019 | Kataoka | G06F 40/242 |
| | | | | 704/9 |
| 2019/0147238 | A1* | 5/2019 | Kanatsu | G06V 30/413 |
| | | | | 382/176 |
| 2019/0318190 | A1* | 10/2019 | Osada | G06F 16/3337 |
| 2022/0415459 | A1* | 12/2022 | Ichinose | G16H 10/60 |

FOREIGN PATENT DOCUMENTS

| | | |
|---|---|---|
| JP | H11134144 A | 5/1999 |
| JP | 2013-114596 A | 6/2013 |
| JP | 6116746 B1 | 4/2017 |
| JP | 2020-16946 A | 1/2020 |
| JP | 6651675 B1 | 2/2020 |
| WO | 2018/092382 A1 | 5/2018 |

OTHER PUBLICATIONS

Japanese Office Action (JPOA) dated Feb. 27, 2024 for Japanese patent application No. 2020-113508; English translation.
Japanese Office Action dated Jul. 9, 2024 for Japanese Patent Application No. 2020-113508; English machine translation.

* cited by examiner

INFORMATION PROCESSING APPARATUS, INFORMATION PROCESSING METHOD, AND COMPUTER PROGRAM

CROSS-REFERENCE TO RELATED APPLICATION

The present application claims priority to Japanese Patent Application No. 2020-113508 filed on Jun. 30, 2020, the entire contents of which are incorporated herein by reference.

TECHNICAL FIELD

The present disclosure relates to an information processing apparatus, an information processing method, and a computer program.

BACKGROUND

Conventionally, technology for identifying an object included in an image and recognizing the position of the object in the image is known. For example, see Patent Literature (PTL) 1.

Optical Character Recognition (OCR) technology for analyzing images, which represent character strings and are generated by use of a scanner or the like, and then converting into character string data is also known.

CITATION LIST

Patent Literature

PTL 1: JP 2013-114596 A

SUMMARY

Technical Problem

When an analog drawing (i.e., a drawing printed on paper, drawn by hand, or the like) containing figures and character strings is created, the figures and character strings may be associated. For example, if a system blueprint depicts a figure indicating a component of the system and a character string describing the figure, the figure and character string can be said to be associated. When such an analog drawing is converted to an image by a scanner and used on a computer, it is useful to be able to use information indicating the association between the figure and the character string from the perspectives of reuse during a drawing search and of reducing data on the drawing.

However, although a conventional configuration can recognize a specific object in an image and convert a character string into character string data, it has not been possible to identify whether a figure and a character string included in an image are somehow associated.

In light of these considerations, the present disclosure aims to provide technology that can automatically generate information indicating that a figure and a character string included in an image are associated.

Solution to Problem

An information processing apparatus according to several embodiments includes a controller configured to acquire an image containing a figure and a character string and generate association information indicating an association between the figure and the character string based on a positional relationship between the figure and the character string in the image. This enables automatic generation of information indicating the association between the figure and the character string.

In the information processing apparatus according to an embodiment, the controller may be configured to generate the association information based on a distance between the figure and the character string and/or a direction of the character string relative to the figure as the positional relationship. This enables accurate generation of information indicating the association between the figure and the character string.

In the information processing apparatus according to an embodiment, the controller may be configured to acquire a predictive model for association that has been machine-learned using a position of a sample figure serving as a sample, a position of a sample character string serving as a sample, and an association between the sample figure and the sample character string as teacher data, and predict, when generating the association information, an association between the figure and the character string based on a positional relationship between the figure and the character string using the predictive model for association. This enables generation of information indicating the association between the figure and the character string without the need to manually set criteria in advance as to whether the figure and the character string are associated.

In the information processing apparatus according to an embodiment, the controller may be configured to detect a predetermined type of figure from the image, and generate the association information based on a positional relationship between the detected figure and the character string. This enables generation of the association information by distinguishing among types of figures.

In the information processing apparatus according to an embodiment, the controller may be configured to acquire a predictive model for figure detection that has been machine-learned using the type and a sample image illustrating a figure of the type as teacher data, and use the predictive model for figure detection when detecting the type of figure in the image. This enables generation of the association information by distinguishing among types of figures without the need to manually set criteria in advance for distinguishing among types of figures.

In the information processing apparatus according to an embodiment, the controller may be configured to analyze the image and acquire a character string included in the image, and generate the association information based on a positional relationship between the detected figure and the acquired character string. This enables generation of the association information by automatically acquiring the character string from the image.

In the information processing apparatus according to an embodiment, the controller may be configured to acquire, as the image, an image including a plurality of figures and a plurality of character strings, and for each figure in the plurality of figures, generate information, as the association information, indicating a character string that is included in the plurality of character strings and has an association with the figure. This enables generation of the association information by identifying the character string that has an association with each figure, even in the case of a plurality of figures and a plurality of character strings being present in the image.

An information processing method according to several embodiments includes acquiring, by a controller, an image containing a figure and a character string, and generating, by the controller, association information indicating an association between the figure and the character string based on a positional relationship between the figure and the character string in the image. This enables the automatic generation of information indicating the association between the figure and the character string.

A computer program according to several embodiments is configured to cause a computer to perform processes including acquiring an image containing a figure and a character string, and generating association information indicating an association between the figure and the character string based on a positional relationship between the figure and the character string in the image. This enables the automatic generation of information indicating the association between the figure and the character string.

Advantageous Effect

According to the present disclosure, technology that can automatically generate information indicating that a figure and a character string included in an image are somehow associated is provided.

DETAILED DESCRIPTION

Comparative Example

Figure 1:
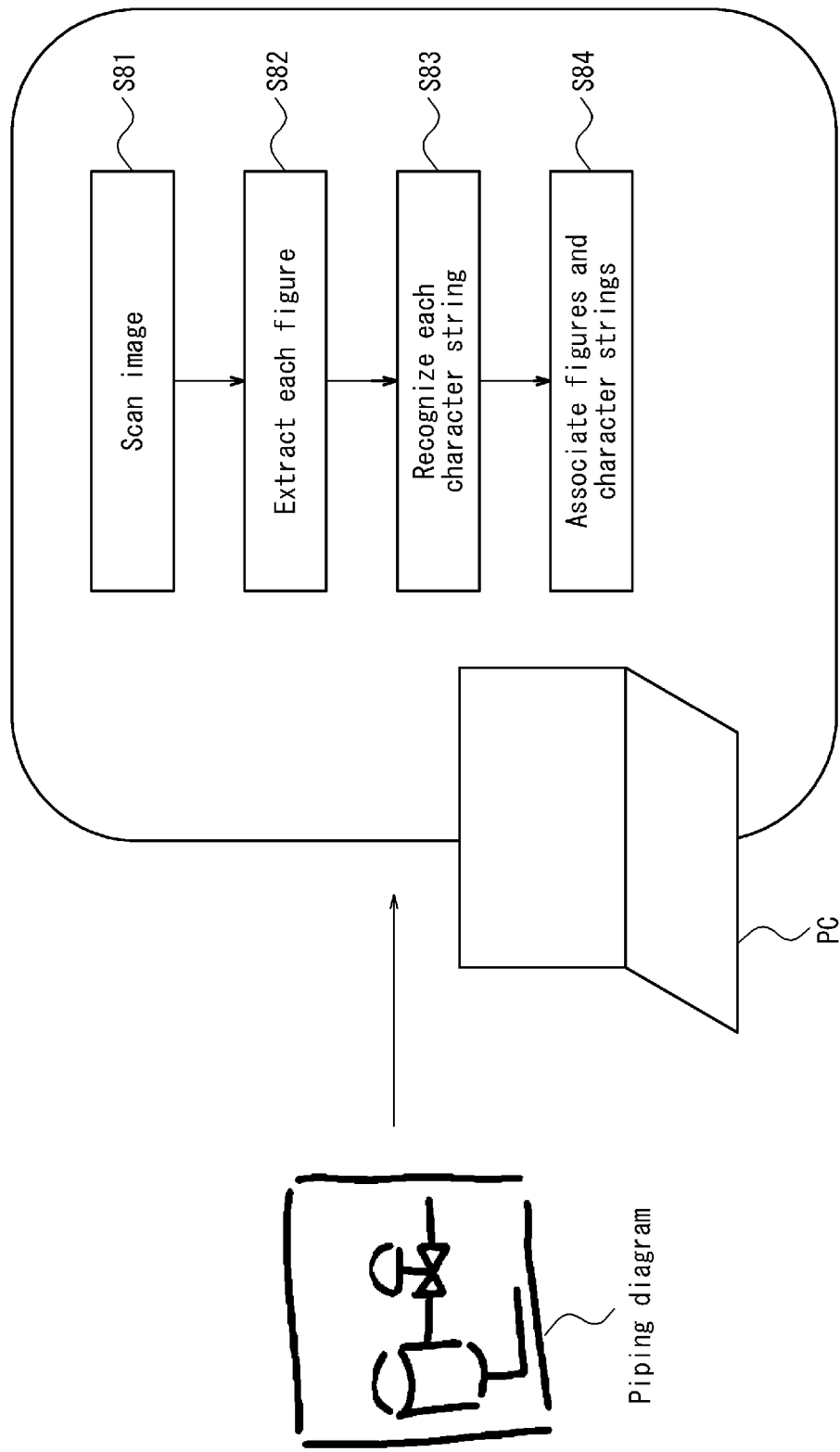
FIG. 1 is a diagram schematically illustrating procedures, by an apparatus according to a comparative example, for associating a figure and a character string from an image of a drawing containing figures and character strings.

FIG. 1 is a diagram schematically illustrating procedures, by an apparatus according to a comparative example, for associating a figure and a character string from an image of an analog drawing containing figures and character strings. FIG. 1 illustrates an example of the case of processing a drawing with a handwritten piping diagram by an apparatus such as a PC. PC is an abbreviation for Personal Computer.

The PC scans the drawing to acquire a scanned image (step S81). In step S81, first, a scanner connected to the PC captures an image of the drawing. The PC then converts the captured image into bitmap data and corrects the bitmap data according to the state of the image. Specifically, the PC corrects the image for skew, distortion, and transparency from the reverse side. The PC stores the corrected image in memory as bitmap data. The image stored in the memory is hereinafter referred to as the "scanned image".

Next, the PC extracts each predetermined figure from the scanned image as pixel data (step S82). In doing so, the PC acquires the position of each extracted figure in the scanned image. The PC may extract each figure using, for example, the method described in PTL 1.

Next, the PC recognizes each character string depicted in the scanned image and acquires character string data (step S83). In doing so, the PC acquires the position of each extracted character string in the scanned image. The PC may recognize character strings by OCR.

Figure 2:
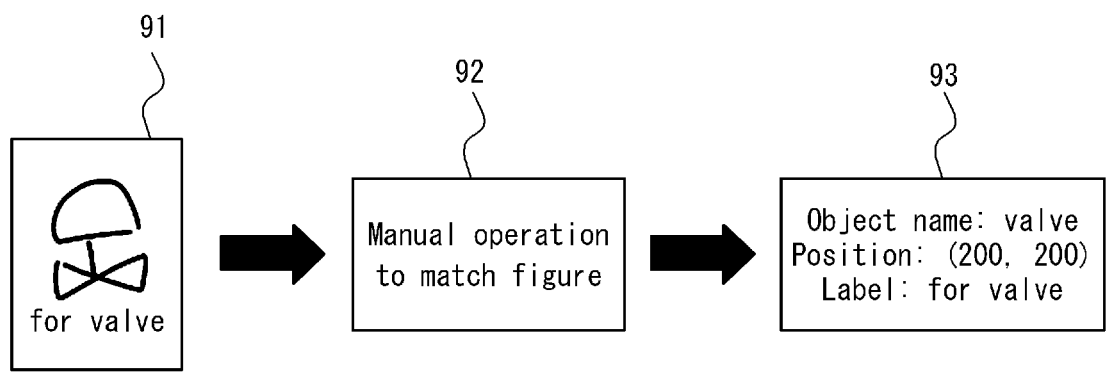
FIG. 2 is a diagram schematically illustrating procedures, by the apparatus according to the comparative example, for detecting an object.

Next, the user operates the PC to associate each figure extracted from the scanned image with a character string depicted in the scanned image (step S84). FIG. 2 is a diagram schematically illustrating procedures, by the apparatus according to the comparative example, for associating a figure and a character string. That is, a user visually confirms the scanned image 91 on a monitor connected to the PC and associates each figure in the scanned image 91 with a character string by matching them (92). In the example in FIG. 2, the user inputs the results of the matching to the PC. In the scanned image 91, there is a handwritten figure indicating a valve and a handwritten character string "for valve" near the figure. The user therefore performs an operation to associate the figure indicating the valve and the character string "for valve". In response, the PC generates information 93 indicating the type and position of the figure and the association with the character string associated with the figure. In the example in FIG. 2, the type of the figure is indicated by "object name: valve" in the information 93. The position of the figure in the scanned image is indicated by "position: (200, 200)". The character string associated with the figure is indicated by "label: for valve". The character string written beside the figure to describe the figure is referred to hereinafter as a "label".

In the comparative example, to acquire information indicating the association between figures and character strings, the user has to visually confirm the scanned image and perform operations to associate each figure in the scanned image with a character string by matching them. Therefore, in the comparative example, manual work on the part of the user is required, and in the case of a large number of drawings to be processed, for example, the processing requires a massive amount of work time. Furthermore, by requiring manual work by the user, the comparative example includes a risk of human error when each figure in the scanned image is associated with a character string.

Embodiment of Present Disclosure

Figure 3:
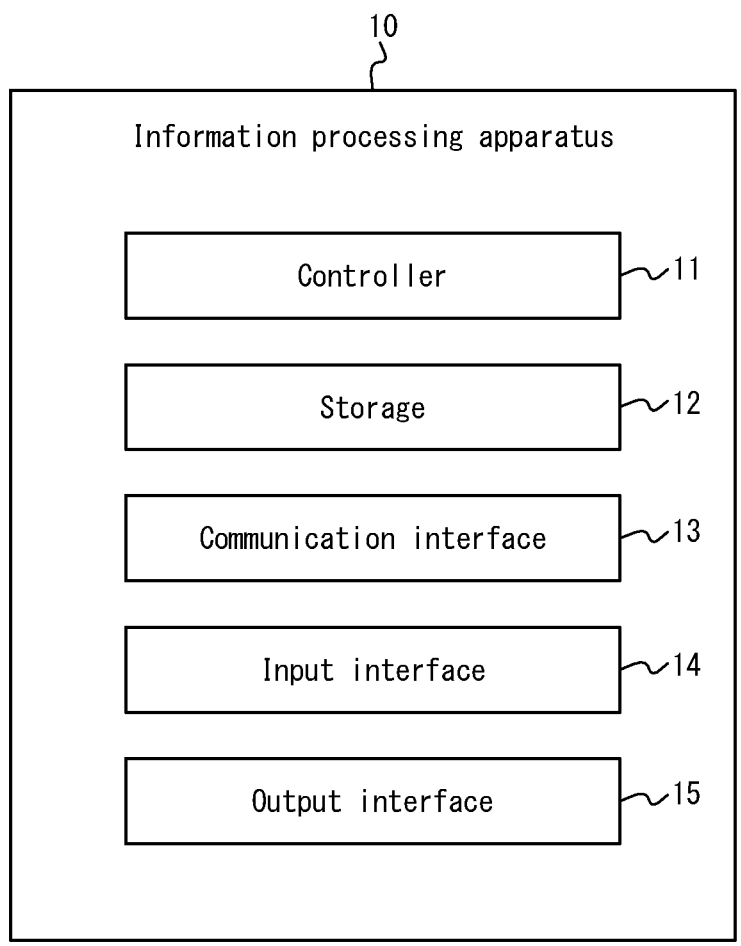
FIG. 3 is a block diagram illustrating a configuration of an information processing apparatus according to an embodiment of the present disclosure.

The configuration and operations of the information processing apparatus according to an embodiment of the present disclosure are mainly described below with reference to the drawings. FIG. 3 is a block diagram illustrating a configuration of an information processing apparatus 10 according to an embodiment of the present disclosure.

The information processing apparatus 10 generates association information indicating the association between figures and character strings based on the positional relationship between figures and character strings included in an image. Therefore, the information processing apparatus 10 according to an embodiment of the present disclosure can automatically generate information indicating the association between figures and character strings, without requiring human intervention. In the present embodiment, character strings includes not only strings consisting of a plurality of characters but also strings consisting of a single character.

The information processing apparatus 10 is one server apparatus or a plurality of communicably connected server apparatuses. The information processing apparatus 10 is not limited to these examples and may be a general purpose electronic device, such as a PC, or another dedicated electronic device. As illustrated in FIG. 3, the information processing apparatus 10 includes a controller 11, a storage 12, a communication interface 13, an input interface 14, and an output interface 15.

The controller 11 includes one or more processors. The "processor" in an embodiment is a general purpose processor or a dedicated processor specialized for particular processing, but these examples are not limiting. The controller 11 is communicably connected with each component of the information processing apparatus 10 and controls operations of the information processing apparatus 10 overall.

The storage 12 may include any appropriate storage module, such as an HDD, SSD, EEPROM, ROM, or RAM. The storage 12 may, for example, function as a main memory, an auxiliary memory, or a cache memory. The storage 12 stores any information used for operations of the information processing apparatus 10. For example, the storage 12 may store a system program, an application program, various types of information received by the communication interface 13, and the like. The storage 12 is not limited to being internal to the information processing apparatus 10 and may be an external database or an external storage module connected through a digital input/output port or the like, such as USB. "HDD" is an abbreviation of Hard Disk Drive. "SSD" is an abbreviation of Solid State Drive. "EEPROM" is an abbreviation of Electrically Erasable Programmable Read-Only Memory. "ROM" is an abbreviation of Read-Only Memory. "RAM" is an abbreviation of Random Access Memory. "USB" is an abbreviation of Universal Serial Bus.

The communication interface 13 includes any appropriate communication module capable of connecting and communicating with other apparatuses, such as a scanner, by any appropriate communication technology. The communication interface 13 may further include a communication control module for controlling communication with other apparatuses and a storage module for storing communication data, such as identification information, necessary for communicating with other apparatuses.

The input interface 14 includes one or more input interfaces that receive a user input operation and acquire input information based on the user operation. For example, the input interface 14 may be physical keys, capacitive keys, a pointing device, a touchscreen integrally provided with a display of the output interface 15, a microphone that receives audio input, or the like, but is not limited to these.

The output interface 15 includes one or more output interfaces that output information to the user to notify the user. For example, the output interface 15 may be a display that outputs information as images, a speaker that outputs information as sound, or the like, but these examples are not limiting. The input interface 14 and/or the output interface 15 described above may be configured integrally with the information processing apparatus 10 or be provided separately.

The functions of the information processing apparatus 10 are implemented by the processor included in the controller 11 executing a computer program (program) according to the present embodiment. In other words, the functions of the information processing apparatus 10 are implemented by software. The computer program causes a computer to execute the processing of the steps included in the operations of the information processing apparatus 10 to implement the functions corresponding to the processing of the steps. That is, the computer program is a program for causing a computer to function as the information processing apparatus 10 according to the present embodiment.

The computer program can be recorded on a computer-readable recording medium. The computer-readable recording medium is, for example, a magnetic recording apparatus, an optical disc, a magneto-optical recording medium, or a semiconductor memory. The program is, for example, distributed by the sale, transfer, or lending of a portable recording medium such as a DVD or CD-ROM on which the program is recorded. "DVD" is an abbreviation of Digital Versatile Disc. "CD-ROM" is an abbreviation of Compact Disc Read Only Memory. The program may be distributed by being stored on a storage of a server and transferred from the server to another computer over a network. The program may be provided as a program product.

For example, the computer can temporarily store, in the main memory, the program recorded on the portable recording medium or transferred from the server. The computer uses a processor to read the program stored in the main memory and executes processing with the processor in accordance with the read program. The computer may read the program directly from the portable recording medium and execute processing in accordance with the program. Each time the program is transferred from the server to the computer, the computer may sequentially execute processing in accordance with the received program. Such processing may be executed by an ASP type of service that implements functions only via execution instructions and result acquisition, without transferring the program from the server to the computer. "ASP" is an abbreviation of Application Service Provider. Examples of the program include an equivalent to the program represented as information provided for processing by an electronic computer. For example, data that is not a direct command for a computer but that has the property of specifying processing by the computer corresponds to the "equivalent to the program".

A portion or all of the functions of the information processing apparatus 10 may be implemented by a dedicated circuit included in the controller 11. In other words, a portion or all of the functions of the information processing apparatus 10 may be implemented by hardware. Furthermore, the information processing apparatus 10 may be implemented by a single information processing apparatus or implemented by cooperation between a plurality of information processing apparatuses.

Figure 4:
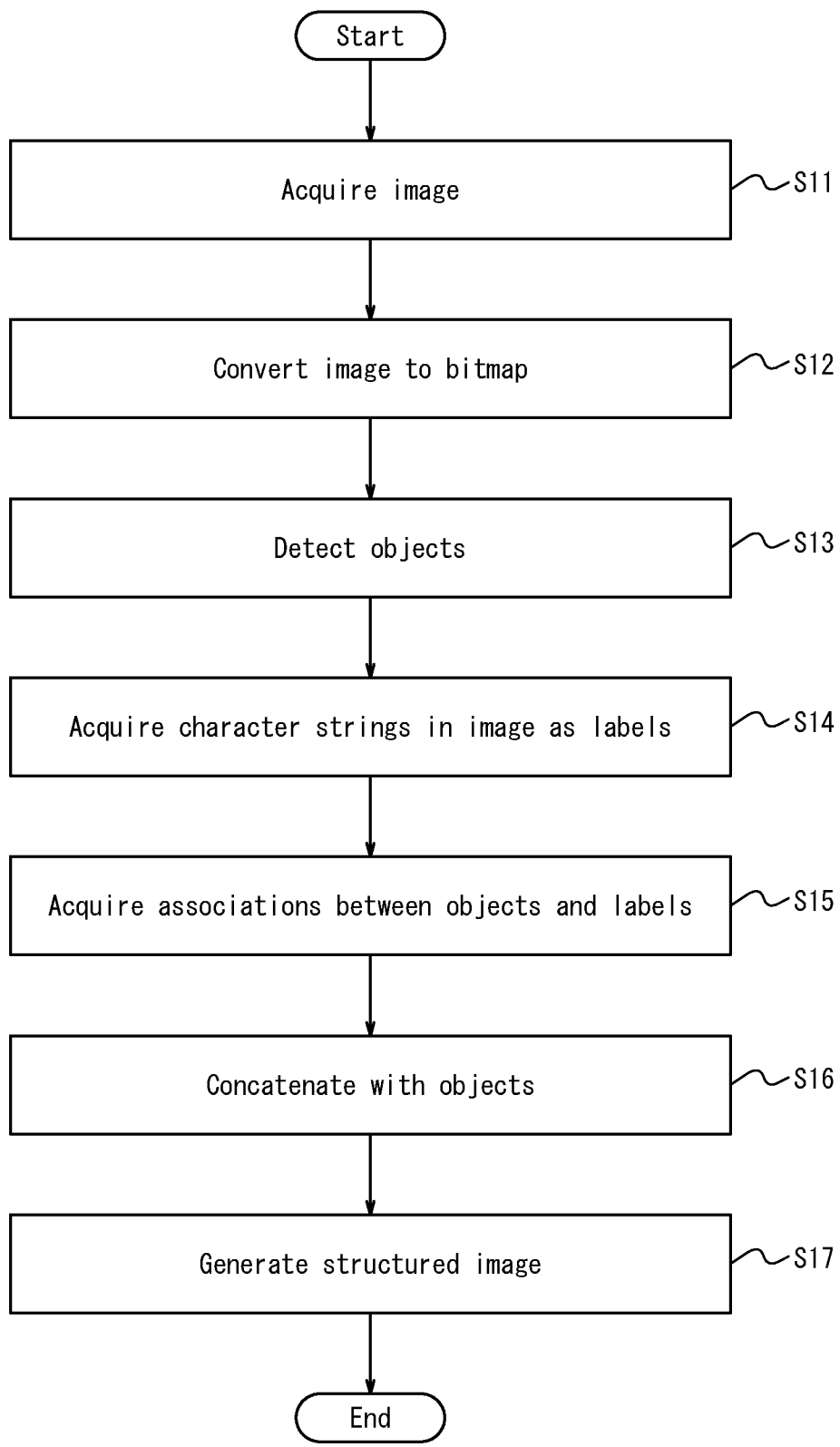
FIG. 4 is a flowchart illustrating operations of the information processing apparatus according to an embodiment of the present disclosure.

With reference to FIG. 4, operations of the information processing apparatus 10 are described. The operations of the information processing apparatus 10 described with reference to FIG. 4 correspond to an information processing method according to the present embodiment, and the operation of each step is performed based on control by the controller 11.

In step S11 of FIG. 4, the controller 11 acquires an image of an analog drawing with figures and character strings. Specifically, the controller 11 acquires the image data of the drawing acquired by the scanner, either directly from that scanner via the communication interface 13 or from an external storage apparatus that stores the image data. Alternatively, the controller 11 may acquire image data stored in the storage 12 in advance.

Figure 5:
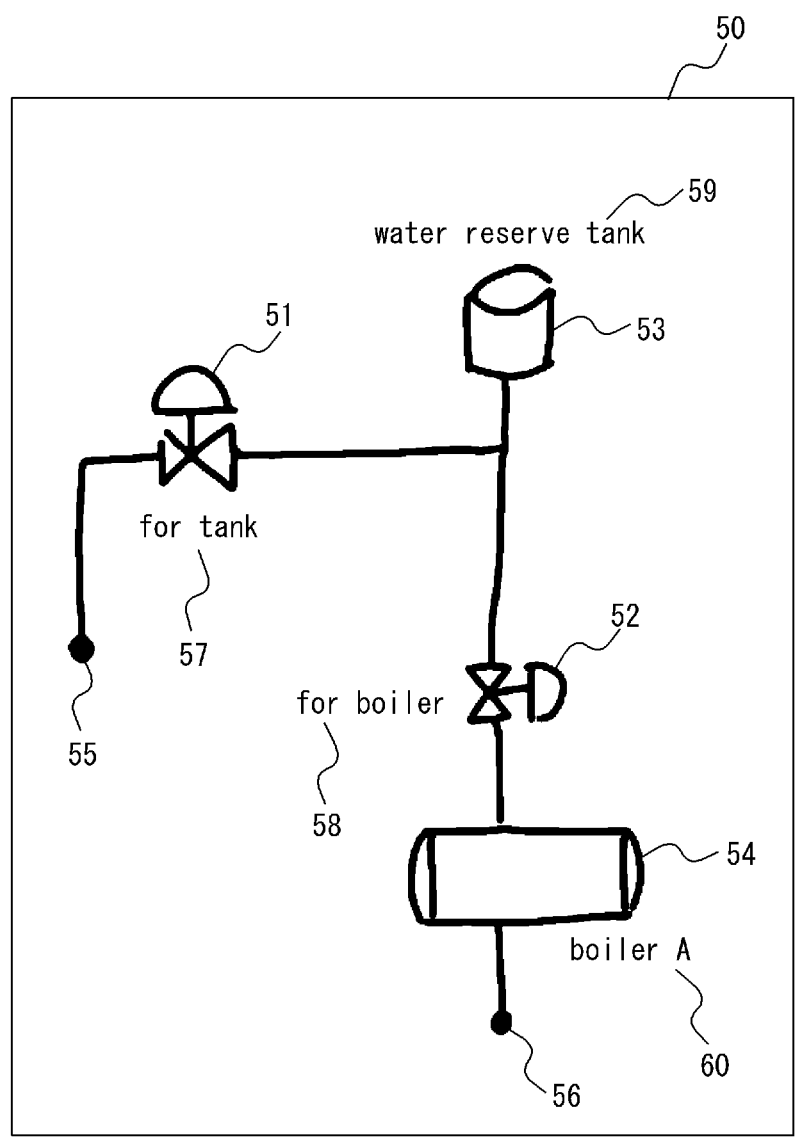
FIG. 5 is a diagram illustrating an example of a handwritten drawing.

FIG. 5 illustrates an example of an image containing handwritten figures and character strings, as indicated by the image data. The image 50 in FIG. 5 contains six FIGS. 51 to 56. Character strings 57 to 60 correspond to the above-described labels. The character string 57 "for tank" is located near the FIG. 51. The character string 58 "for boiler" is located near the FIG. 52. The character string 59 "water storage tank" is located near the FIG. 53. The character string 60 "boiler A" is located near the FIG. 54. No character string is located near the FIGS. 55 and 56.

Figure 6:
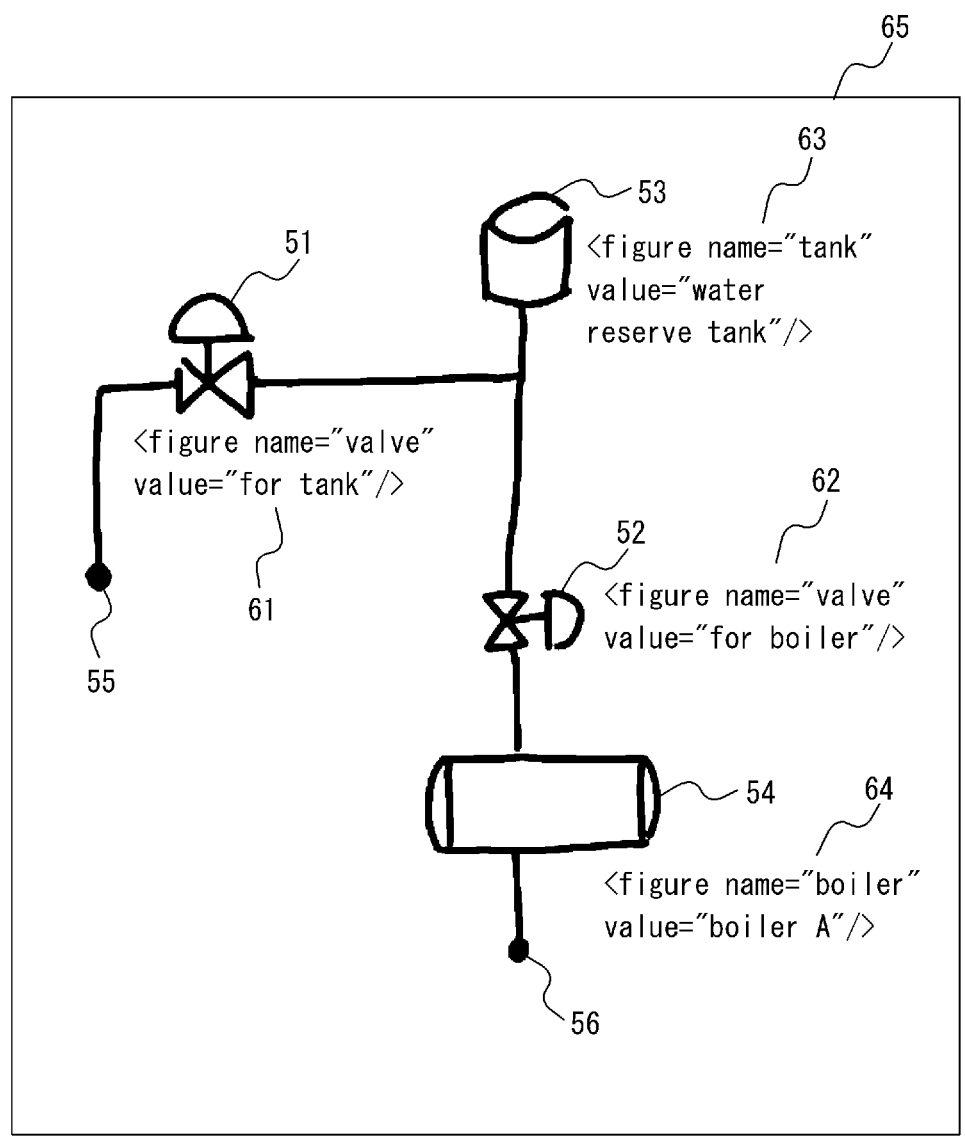
FIG. 6 is a diagram illustrating an example of data in which object and label information is concatenated in the drawing in FIG. 5.

As described in detail below, the controller 11 generates association information indicating the association between figures and character strings based on the positional relationships between the FIGS. 51 to 56 and the character strings 57 to 60 included in the image 50 and generates a structured image by connecting the association information to the image 50. FIG. 6 illustrates an example of a structured image generated based on the image 50. In FIG. 6, the structured image 65 contains the FIGS. 51 to 56 with the same positional relationships as in the image 50. The FIGS. 51 to 54 are labeled with information 61 to 64 indicating the type of figure and the label.

In the present embodiment, an example in which the information 61 to 64 is described in XML format is provided, but the format of this information is not limited to XML. For example, these pieces of information may be described in CSV or JSON format. "XML" is an abbreviation of Extensible Markup Language. CSV is an abbreviation of "Comma-Separated Values". "JSON" is an abbreviation of "JavaScript Object Notation". In the information 61 to 64, the "figure" tag indicates that the item is a figure. The attribute "name" indicates the type of figure. The attribute "value" indicates the character string that corresponds to the content of the label associated with the figure. For example, in the information 61, the type of the FIG. 51 is "valve". The character string corresponding to the content of the label associated with the FIG. 51 is "for tank".

For the sake of understanding, the corresponding information 61 to 64 near the FIGS. 51 to 54 is illustrated in FIG. 6, but when the image 65 is displayed on the display of the output interface 15, the information 61 to 64 is not displayed. The information 61 to 64 is used when the computer uses the image 65 for retrieval or other purposes. However, the information 61 to 64 can be displayed near the corresponding FIGS. 51 to 54 to enable the user to confirm the type and label of each figure. In FIG. 6, information on the type and label of the figure is not attached to FIGS. 55 and 56, for which no corresponding label exists, but this information may be attached.

In step S12 of FIG. 4, the controller 11 converts the image data acquired in step S11 to bitmap data and corrects the bitmap data according to the state of the image. Specifically, the controller 11 corrects the image for skew, distortion, and transparency from the reverse side. The controller 11 stores the corrected image data in memory on the storage 12 as bitmap data. The image stored in the memory is hereinafter referred to as the "scanned image".

In step S13 of FIG. 4, the controller 11 detects objects in the scanned image stored in the memory in step S12.

Hereafter, each figure contained in the scanned image is abstracted, and each figure classified by a predefined figure detection model is referred to as an "object". An object is, for example, information indicating the type and position of a figure. The controller 11 detects an object by detecting a predetermined type of figure from the scanned image. Specifically, the controller 11 acquires a predictive model for figure detection that has been machine-learned using the type of figure and a sample image illustrating a figure of that type as teacher data and uses the predictive model to detect the object. The controller 11 thus performs object detection processing using the predictive model acquired by machine learning, but object detection processing may also be performed based on criteria set by the user.

Figure 7:
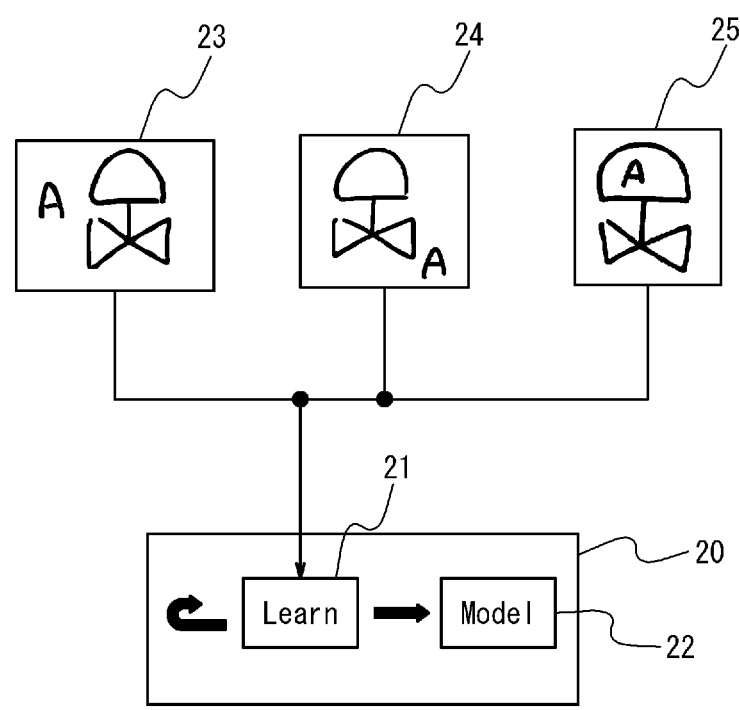
FIG. 7 is a diagram illustrating an example of how a predictive model for figure detection is generated.

FIG. 7 schematically illustrates an example of generating a predictive model for figure detection by machine learning using the type of figure and a sample image illustrating a figure of that type as teacher data. The generation of the predictive model illustrated by FIG. 7 is performed before the controller 11 performs the process of generating association information indicating the association between the figure and the character string. The predictive model is generated by the information processing apparatus 10 but may be generated by another computer.

In the example in FIG. 7, a model generator 20, which is a functional element implemented by a computer program on the information processing apparatus 10, generates a predictive model 22. In the example in FIG. 7, a plurality of sample images 23 to 25 indicating a figure of the type "valve" are inputted to the model generator 20. The model generator 20 learns these sample images 23 to 25, which correspond to figures of the type "valve", as teacher data (21) and generates the predictive model 22 for images indicating the figure "valve".

Figure 8:
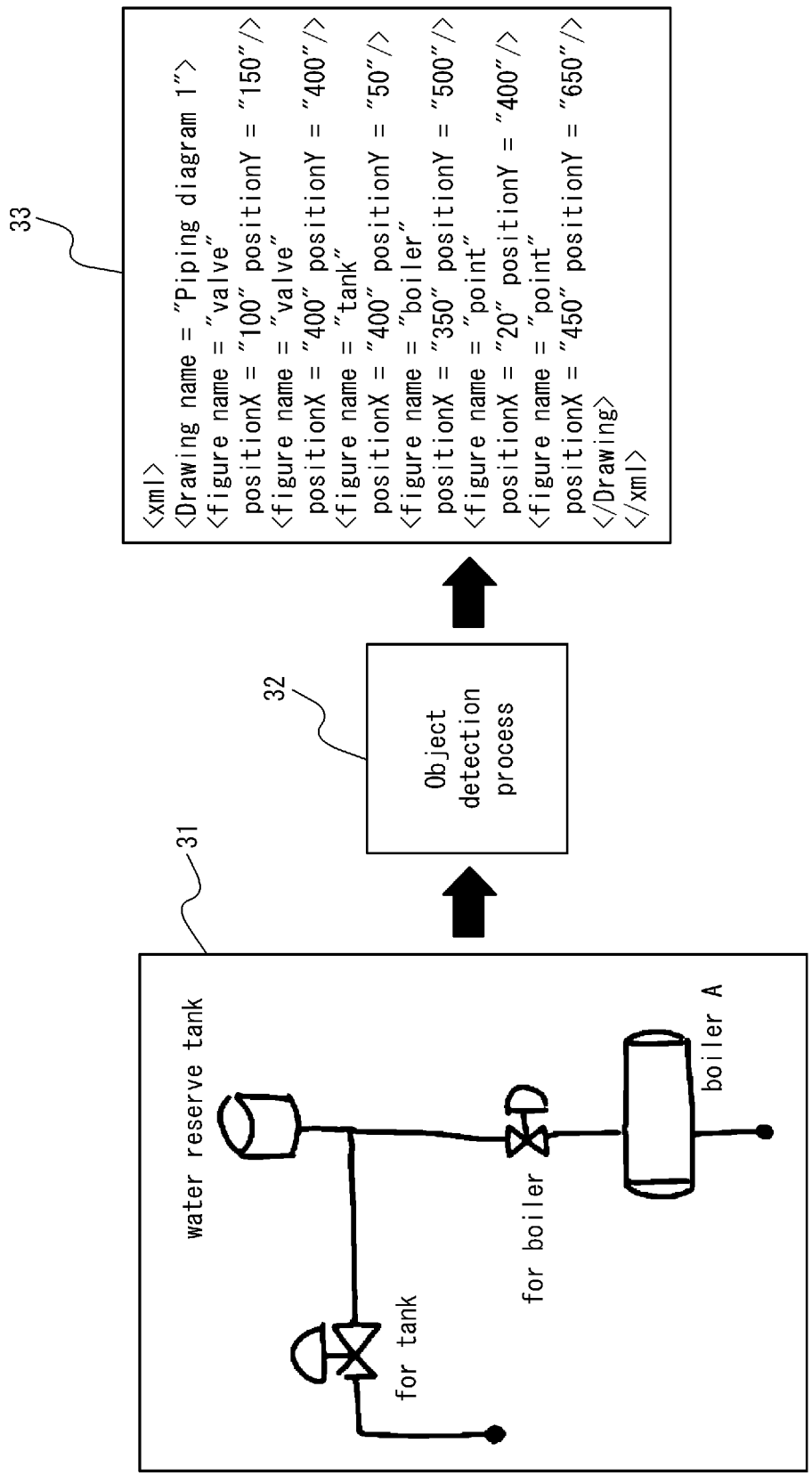
FIG. 8 is a diagram illustrating an example of an object detection process by an information processing apparatus according to an embodiment of the present disclosure.

The controller 11 uses the predictive model thus generated to detect objects in the scanned image. FIG. 8 illustrates an example of the object detection process. The controller 11 performs the object detection process on the scanned image 31 to detect objects using the above-described predictive model (32). The controller 11 outputs the detected objects as information 33 in XML format. In the information 33, the name "piping diagram 1" is described by the attribute "name" of the "Drawing" tag. The "figure" tags indicate information about each figure included in the scanned image of the "piping diagram 1". The attribute "name" in the "figure" tag indicates the name of the type of figure. The attributes "positionX" and "positionY" indicate the XY coordinates corresponding to the position of the figure. For example, for the figure with the handwritten character string "water storage tank" in the scanned image 31, the information "<figure name='tank' positionX='400' positionY='50'/>" is generated. This information indicates that the type of figure is "tank", and the position of the figure is (400, 50). The format of information on the object is not limited to XML and may, for example, be CSV or JSON.

In step S14 of FIG. 4, the controller 11 analyzes the scanned image to acquire character strings included in the scanned image as labels. This process may be performed using existing OCR technology. The information acquired by step S14 includes, for each character string, character string data indicating the content of the character string and information indicating the position of the character string in the scanned image. Furthermore, existing morphological analysis technology may be used to classify character strings into words or phrases, and parts of speech may be identified for each phrase. Such grammatical information on the character string is identified for each character string and recorded as a label, thereby enabling more accurate retrieval of images using such grammatical information.

In step S15 of FIG. 4, the controller 11 acquires the associations between the objects detected in step S13 and the labels acquired in step S14. Then, in step S16, the controller 11 concatenates and appends the information on the associated labels to the information on the objects.

In this way, the controller 11 generates association information indicating the association between figures and character strings based on the positional relationship between figures and character strings included in an image. Specifically, the controller 11 generates the association information based on the distance between the figure and the character string and/or the direction of the character string relative to the figure as the positional relationship between the figure and the character string. The controller 11 may, for example, may acquire a character string located near, i.e. at a distance within a predetermined value, from a figure as the character string associated with that figure. Alternatively, the controller 11 may acquire a character string located in a specific direction, as viewed from a figure, as the character string associated with that figure. Since a character string associated with a figure is generally depicted near the character string of that figure, determining the association based on the positional relationship between the figure and character string enables accurate, automatic generation of information indicating that the figures and character strings included in an image are somehow associated.

The criteria for determining whether such an association between a figure and a character string exists are acquired in advance by the controller 11 as a predictive model acquired by machine learning in the present embodiment. In other words, the controller 11 acquires a predictive model for association that has been machine-learned using a position of a sample figure serving as a sample, a position of a sample character string serving as a sample, and an association between the sample figure and the sample character string as teacher data. The controller 11 furthermore predicts, when generating the association information, an association between the figure and the character string based on a positional relationship between the figure and the character string using the predictive model for association. This enables generation of information indicating the association between the figure and the character string without the need to manually set criteria in advance as to whether the figure and the character string are associated.

In the present embodiment, in a case in which a plurality of figures and a plurality of character strings are included in a scanned image, the controller 11 generates, for each of the figures, association information indicating which character string among the plurality of character strings is associated with the figure. Accordingly, the association information can be generated by identifying the character string that has an association with each figure, even in the case of a plurality of figures and a plurality of character strings being present in the image.

Figure 9:
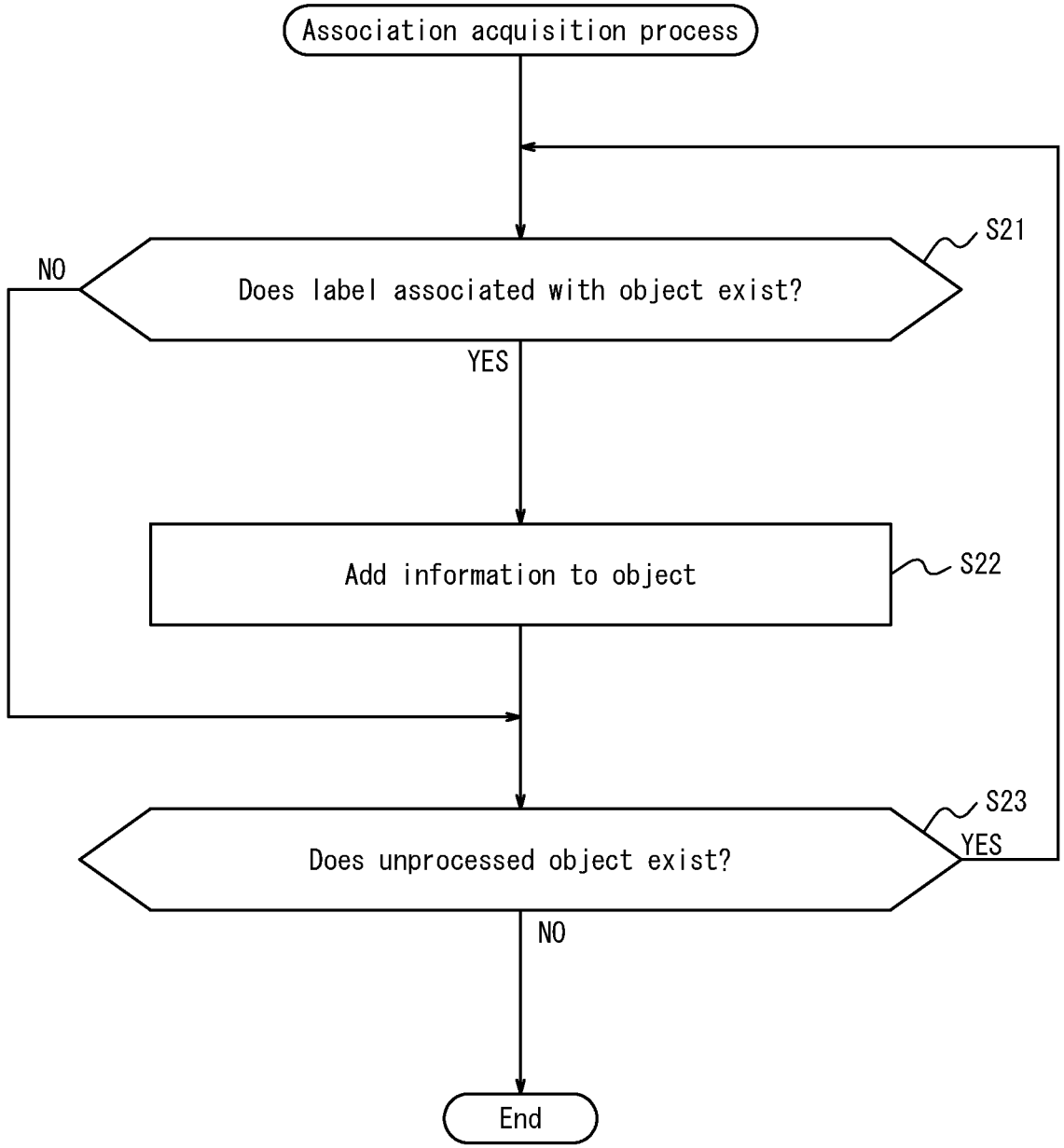
FIG. 9 is a flowchart illustrating an association acquisition process by an information processing apparatus according to an embodiment of the present disclosure.

FIG. 9 is a flowchart illustrating the processing procedures of an association acquisition process for generating association information in a case in which a plurality of figures is included in a scanned image. In the association acquisition process, the controller 11 determines whether a label to be associated exists for each of the objects related to the figures included in the scanned image, and in a case in which such a label exists, the controller 11 adds information on the label to the information of the object.

In step S21 of FIG. 9, the controller 11 determines whether an associated label exists for the figure of the object of interest. This determination is based on the positional relationship between the figure and the character string, as described above. In a case in which the label exists (YES in step S21), the controller 11 performs the process of step S22. In a case in which the label does not exist (NO in step S21), the controller 11 performs the process of step S23.

In step S22 of FIG. 9, the controller 11 adds information on the associated label to the information on the object of interest. The controller 11 then performs the process of step S23.

In step S23 of FIG. 9, the controller 11 determines whether an unprocessed object exists in the scanned image. In a case in which an unprocessed object exists (YES in step S23), the controller 11 performs the process of step S21. In a case in which an unprocessed object does not exist (NO in step S23), the controller 11 ends the association acquisition process.

Figure 10:
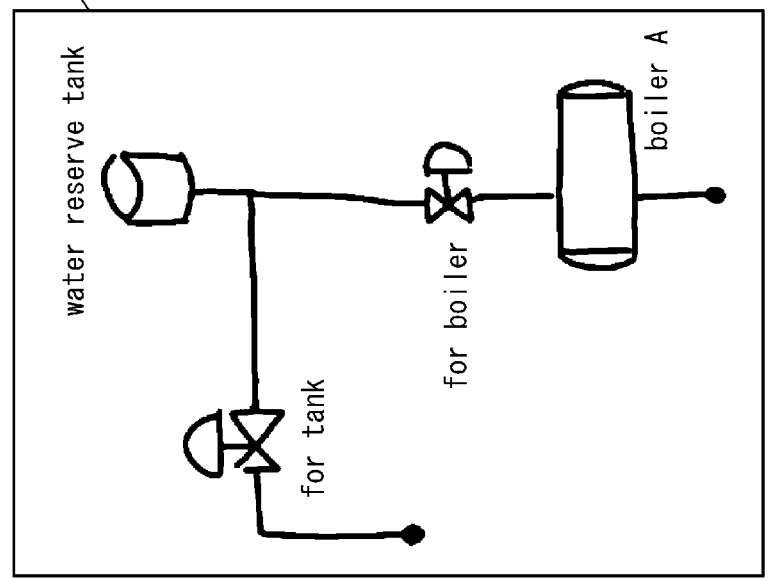
FIG. 10 is a diagram illustrating an example of an association acquisition process by an information processing apparatus according to an embodiment of the present disclosure.

FIG. 10 is a diagram illustrating an example of the association acquisition process. The controller 11 performs the aforementioned association acquisition process for the information on objects in the scanned image 41 (42). The controller 11 outputs the result of adding the label to the information 33 of the object as information 43 in XML format. As is clear by comparing the information 33 in FIG. 8 with the information 43 in FIG. 10, the two figures of type "valve", the figure of type "tank", and the figure of type "boiler" have associated labels, so information corresponding to the labels is added. For example, the information on the label "value='Boiler A'" is added as an attribute to the information "<figure name='tank' positionX='400' positionY='50'/>" in the scanned image 31. This information indicates that the label "boiler A" is associated with the figure of type "tank" located at position (400, 50). The format of the association information is not limited to XML but can, for example, be CSV or JSON.

In step S17 of FIG. 4, the controller 11 concatenates the association information generated up to step S16 for the scanned image 41 to generate the structured image described above with reference to FIG. 6. The controller 11 then terminates the process.

As described above, the information processing apparatus 10 generates association information indicating the association between figures and character strings based on the positional relationship between figures and character strings included in a scanned image. Specifically, the information processing apparatus 10 generates the association information based on the distance between the figure and the character string and/or the direction of the character string relative to the figure as the positional relationship. Accordingly, information indicating that a figure and a character string included in an image are somehow associated can be automatically generated, without human intervention. According to this configuration, information on the figures included in the drawing and the character strings associated with the figures can be easily provided to a handwritten drawing in a form usable by a computer. The applications of handwritten drawings on computers can therefore be expanded, for example to retrieval of handwritten drawings.

Although embodiments of the present disclosure have been described through drawings and examples, it is to be noted that various changes and modifications will be apparent to those skilled in the art on the basis of the present disclosure. Therefore, such changes and modifications are to be understood as included within the scope of the present disclosure. For example, the functions or the like included in the various components or steps may be reordered in any logically consistent way. Furthermore, components or steps may be combined into one or divided.

REFERENCE SIGNS LIST

10 Information processing apparatus
11 Controller
12 Storage
13 Communication interface
14 Input interface
15 Output interface

The invention claimed is:

1. An information processing apparatus comprising a controller configured to:
acquire an image containing a figure and a character string, and
generate association information indicating an association between the figure and the character string based on a positional relationship between the figure and the character string in the image,
wherein the controller is configured to
acquire a predictive model for association that has been machine-learned using a position of a sample figure serving as a sample, a position of a sample character string serving as a sample, and an association between the sample figure and the sample character string as teacher data, and
predict, when generating the association information, an association between the figure and the character string based on a positional relationship between the figure and the character string using the predictive model for association.

2. The information processing apparatus according to claim 1, wherein the controller is configured to generate the association information based on a distance between the figure and the character string and/or a direction of the character string relative to the figure as the positional relationship.

3. The information processing apparatus according to claim 1, wherein the controller is configured to
detect a predetermined type of figure from the image, and
generate the association information based on a positional relationship between the detected figure and the character string.

4. The information processing apparatus according to claim 3, wherein the controller is configured to
analyze the image and acquire a character string included in the image, and
generate the association information based on a positional relationship between the detected figure and the acquired character string.

5. The information processing apparatus according to claim 1, wherein the controller is configured to
acquire, as the image, an image including a plurality of figures and a plurality of character strings, and
for each figure in the plurality of figures, generate information, as the association information, indicating a character string that is included in the plurality of character strings and has an association with the figure.

6. An information processing apparatus comprising a controller configured to:
acquire an image containing a figure and a character string, and
generate association information indicating an association between the figure and the character string based on a positional relationship between the figure and the character string in the image,
wherein the controller is configured to
acquire a predictive model for figure detection that has been machine-learned using a type of figure and a sample image illustrating a figure of the type as teacher data,
detect a predetermined type of figure from the image using the predictive model for figure detection, and
generate the association information based on a positional relationship between the detected figure and the character string.

7. An information processing method comprising:
acquiring, by a controller, an image containing a figure and a character string; and
generating, by the controller, association information indicating an association between the figure and the character string based on a positional relationship between the figure and the character string in the image,
wherein the method further comprises:
acquiring, by the controller, a predictive model for association that has been machine-learned using a position of a sample figure serving as a sample, a position of a sample character string serving as a sample, and an association between the sample figure and the sample character string as teacher data, and
predicting, by the controller, when generating the association information, an association between the figure and the character string based on a positional relationship between the figure and the character string using the predictive model for association.

8. A non-transitory computer readable medium storing a computer program configured to cause a computer to perform processes comprising:
acquiring an image containing a figure and a character string; and
generating association information indicating an association between the figure and the character string based on a positional relationship between the figure and the character string in the image,
wherein the processes further comprise:
acquiring a predictive model for association that has been machine-learned using a position of a sample figure serving as a sample, a position of a sample character string serving as a sample, and an association between the sample figure and the sample character string as teacher data, and
predicting, when generating the association information, an association between the figure and the character string based on a positional relationship between the figure and the character string using the predictive model for association.

* * * * *